US011373314B2

(12) United States Patent
Senzaki

(10) Patent No.: US 11,373,314 B2
(45) Date of Patent: Jun. 28, 2022

(54) LAND MASK IMAGE GENERATION FOR OCEAN SURFACE AND LAND SURFACE

(71) Applicant: NEC Corporation, Tokyo (JP)

(72) Inventor: Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 99 days.

(21) Appl. No.: 17/040,276

(22) PCT Filed: Apr. 5, 2018

(86) PCT No.: PCT/JP2018/014504
§ 371 (c)(1),
(2) Date: Sep. 22, 2020

(87) PCT Pub. No.: WO2019/193702
PCT Pub. Date: Oct. 10, 2019

(65) Prior Publication Data
US 2021/0004964 A1 Jan. 7, 2021

(51) Int. Cl.
*G06T 7/11* (2017.01)
*G06T 7/136* (2017.01)
*G06V 20/13* (2022.01)
*G06K 9/00* (2022.01)

(52) U.S. Cl.
CPC ............. *G06T 7/11* (2017.01); *G06T 7/136* (2017.01); *G06V 20/13* (2022.01); *G06K 9/00* (2013.01); *G06T 2207/10044* (2013.01); *G06T 2207/30181* (2013.01)

(58) Field of Classification Search
CPC .. G06K 9/00; G06T 7/11; G06T 7/136; G06T 2207/10044; G06T 2207/30181; G06V 20/13
See application file for complete search history.

(56) References Cited

FOREIGN PATENT DOCUMENTS

JP 2000275338 A 10/2000
JP 2003288581 A 10/2003
(Continued)

OTHER PUBLICATIONS

Zhang et al., "Ice Water Classification Using Statistical Distribution Based Conditional Random Fields in RADARSAT-2 Dual Polarization Imagery" (Year: 2015).*

(Continued)

*Primary Examiner* — Kenny A Cese
(74) *Attorney, Agent, or Firm* — Sughrue Mion, PLLC

(57) ABSTRACT

An image processing device 10 includes: a segmentation unit 21 that segments an input image 200 representing a result of observing an ocean surface region and a land surface region from overhead into ocean surface block images 211 and land surface block images 212, based on a segmentation criterion 210; a first determination unit 22 that determines a binarization criterion 220 for the ocean surface block images 211, based on a scattering model for electromagnetic waves in the ocean surface region; a second determination unit 23 that determines a binarization criterion 230 for the land surface block images 212, based on the binarization criterion 220 and a positional relationship between the ocean surface block images and the land surface block images; and a generation unit 25 that generates a land mask image 250 by performing binarization processing on the input image 200 based on the binarization criterion 220 and the binarization criterion 230. Consequently, the image processing device 10 improves the accuracy in generating the land mask image for differentiating between the ocean surface region and the land surface region in remote sensing technology.

14 Claims, 8 Drawing Sheets

(56) References Cited

FOREIGN PATENT DOCUMENTS

| JP | 2005148906 A | 6/2005 |
| JP | 2008147978 A | 6/2008 |
| JP | 200993472 A | 4/2009 |
| JP | 2010197337 A | 9/2010 |
| JP | 201365277 A | 4/2013 |
| JP | 201389021 A | 5/2013 |

OTHER PUBLICATIONS

Dare, "New Techniques for the Automatic Registration of Microwave and Optical Remotely Sensed Images" (Year: 1999).*

Fitzpatrick, "Rotation and Scale Invariant Texture Segmentation Applied to SAR Sea Ice Images" (Year: 2006).*

Zhu, "Application of Satellite Remote Sensing on Mountain Glacier and Coastal Zone Classification and Monitoring in South Asia" (Year: 2015).*

Xiangguang Leng, et al. "An Adaptive Ship Detection Scheme for Spaceborne SAR Imagery", Sensors, vol. 16, 2016, (22 pages total).

Gui Gao et al. "Scheme of Parameter Estimation for Generalized Gamma Distribution and Its Application to Ship Detection in SAR Images", IEEE Transactions on Geoscience and Remote Sensing, vol. 55, No. 3, Mar. 2017, pp. 1812-1832 ( 21 pages total).

Written Opinion of the International Searching Authority dated Jul. 3, 2018, in International Application No. PCT/JP2018/014504.

International Search Report dated Jul. 3, 2018 in International Application No. PCT/JP2018/014504.

* cited by examiner

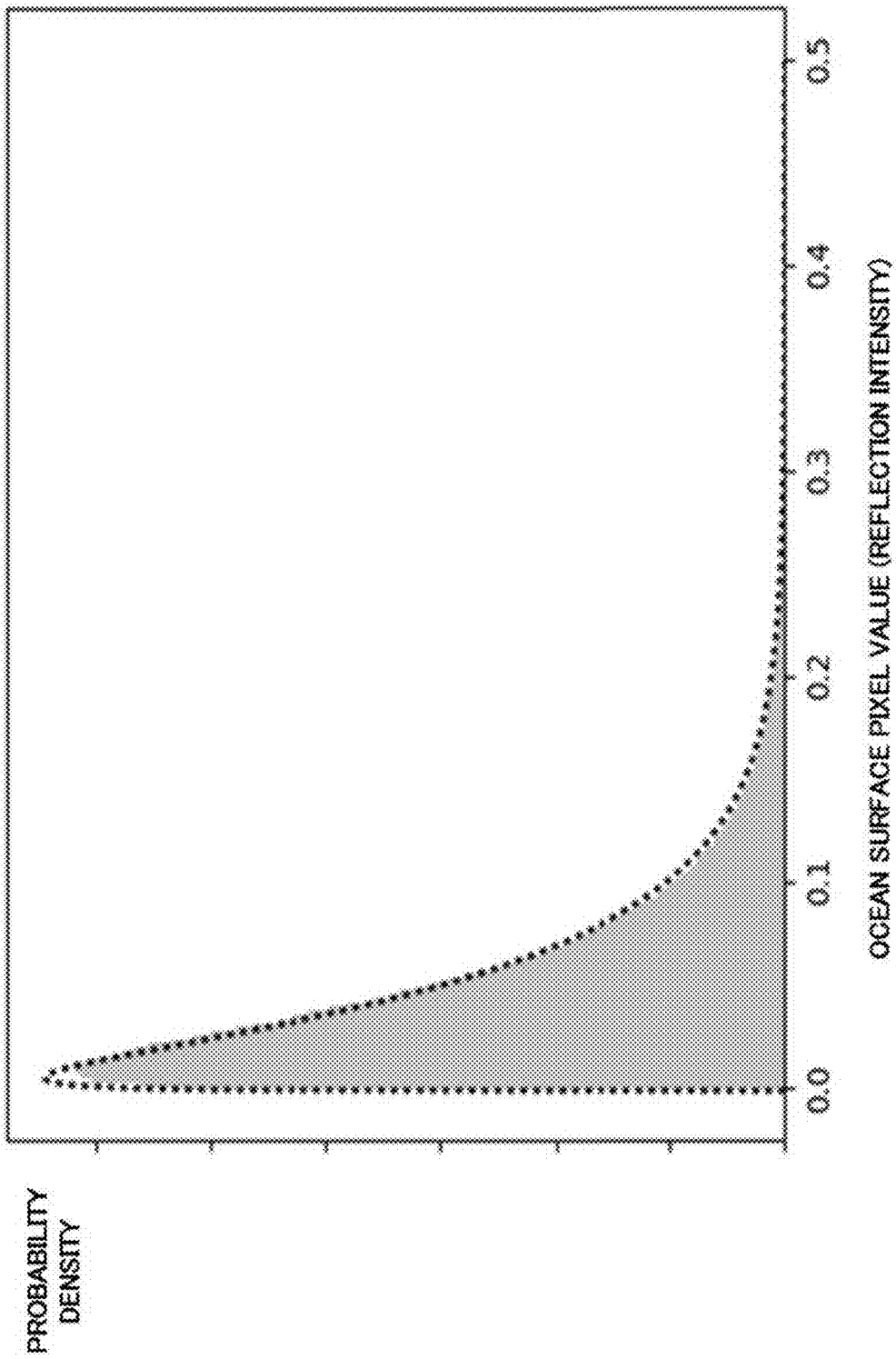

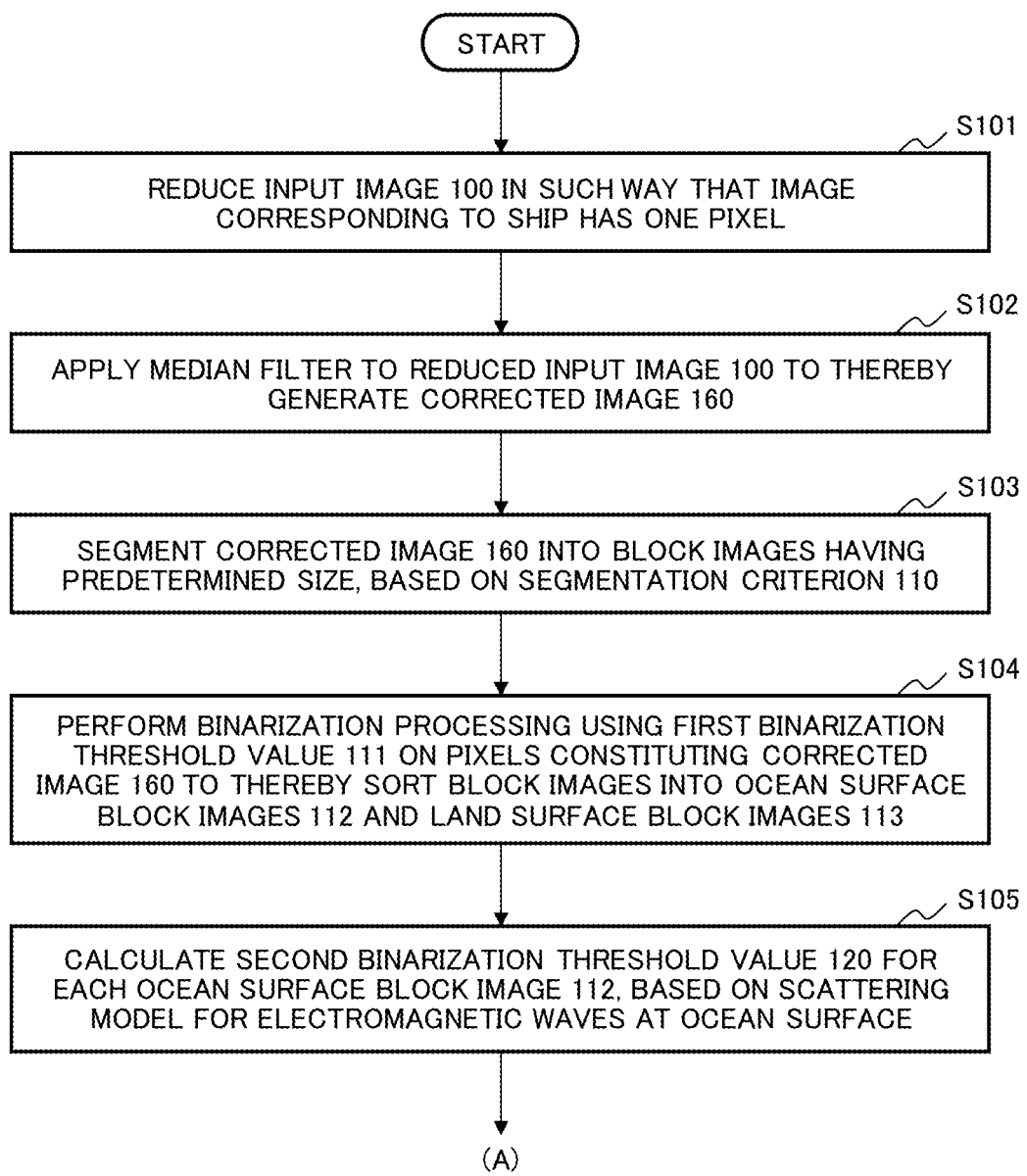

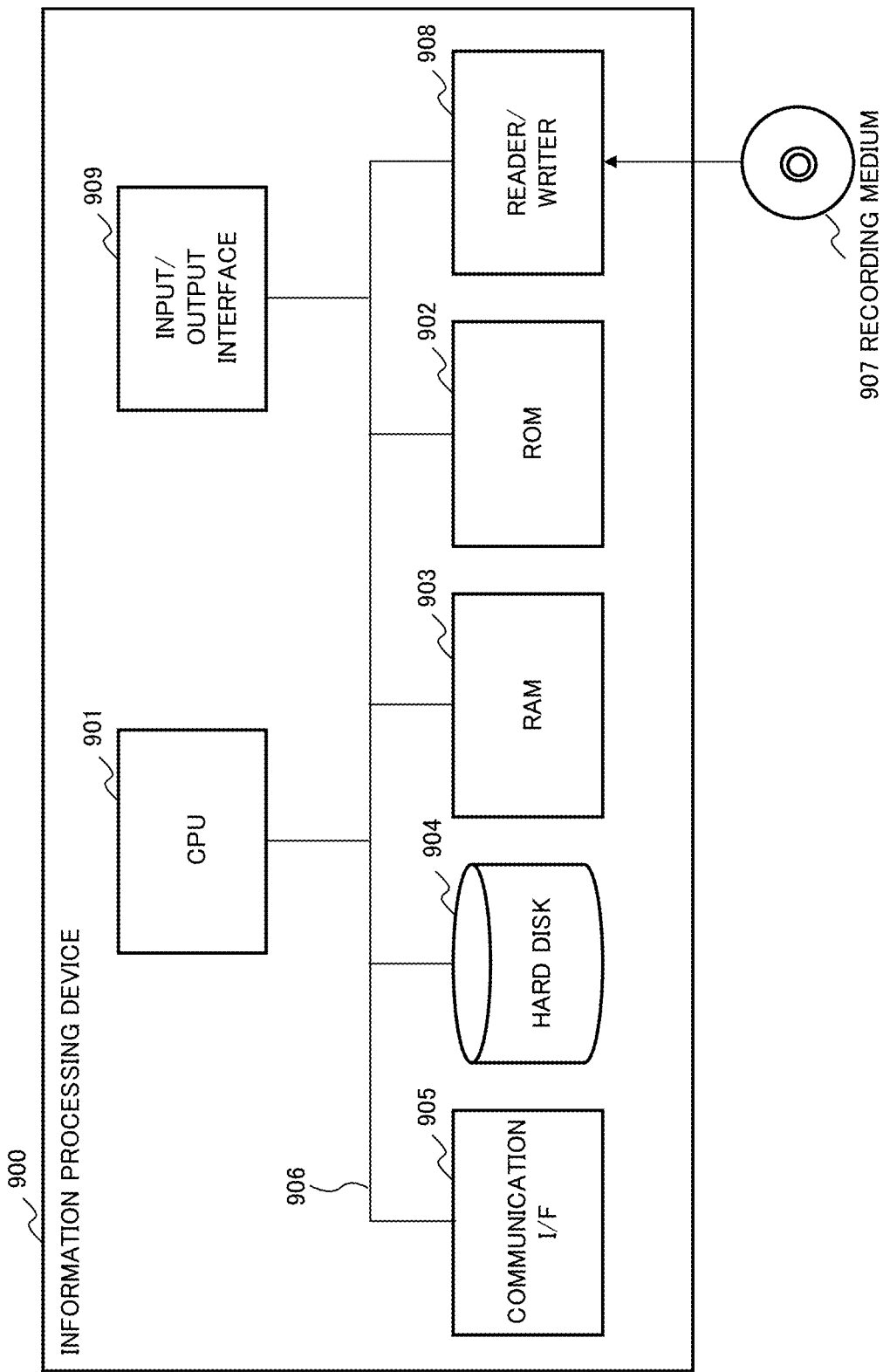

LAND MASK IMAGE GENERATION FOR OCEAN SURFACE AND LAND SURFACE

This application is a National Stage Entry of PCT/JP2018/014504 filed on Apr. 5, 2018, the contents of all of which are incorporated herein by reference, in their entirety.

TECHNICAL FIELD

The invention of the present application relates to a technology of generating a land mask image for differentiating between an ocean surface region and a land surface region in remote sensing technology for observing and analyzing the ocean surface region and the land surface region from overhead.

BACKGROUND ART

Remote sensing technology that observes and analyzes an area to be observed from overhead has been spreading for the purpose of grasping the situation and the like of the ocean surface and the land surface (grounds). One of representative technologies in this remote sensing technology is active sensing technology using a synthetic aperture radar (hereinafter sometimes referred to as SAR in the present application). In this active sensing technology, an electromagnetic wave (microwave) is emitted toward the ground from an antenna of the SAR mounted on an aircraft or satellite, and the electromagnetic wave backscattered by a target object located on the ground is acquired by an antenna. Unlike a passive sensing technology, which uses the reflected light of the sun, the SAR is capable of capturing images at any time of day and night because the SAR actively emits electromagnetic waves toward an observation target. Since the wavelength of the electromagnetic wave emitted from the SAR is relatively long, the electromagnetic wave penetrates through clouds, fog, and rain. For this reason, the SAR enables remote sensing even in adverse weather conditions.

Remote sensing for the ocean is cited as one useful application field relating to the SAR. That is, most of the emitted electromagnetic waves are specularly reflected on the water surface and almost no backscattering toward the direction of the antenna is produced, which decreases the intensity of a signal to be observed. In contrast to this, strong backscattering is caused by objects such as ships present on the sea, and accordingly the intensity of a signal to be observed is increased. Thus, in an image (SAR image) representing the observation result by the SAR, ships and the like present on the sea can be easily differentiated from the ocean surface on the background. Therefore, the application to the detection of suspicious ships and illegally operating ships, and the like using such characteristics included in the observation results by the SAR are expected.

Meanwhile, since the land surface region also causes strong backscattering compared with the ocean surface region, land masking processing is performed in remote sensing for the ocean to mask (shield) the land surface region on the image and exclude the masked land surface region from the processing target. Since most of images obtained by remote sensing, such as the SAR images, have map (position) information such as latitude and longitude in every pixel, examples of the land masking processing include a method of discriminating whether each pixel is included in the ocean surface region or in other regions, by referring to shoreline information, land cover information, and the like as auxiliary information for each pixel constituting such an image.

Such a method using the shoreline information or land cover information has disadvantages, for example, in that it is necessary to prepare these pieces of information as auxiliary information in advance, or information on new reclaimed land and the like is not sometimes included in these pieces of information. In order to cope with such disadvantages, for example, as indicated in NPL 1, there is a technology of generating a land mask image for differentiating between the ocean surface region and the land surface region by inferring the ocean surface region and the land surface region based only on the input SAR image without requiring auxiliary information. Besides, an image processing technology capable of generating such a land mask image with higher accuracy is expected.

As a technology related to such a technology, PTL 1 discloses an image processing device configured to automatically determine a threshold value for extracting a region having a different wavelength band from geographic image data captured from high altitude. This device arithmetically operates a normalized index value for identifying a pixel among pixels of the geographic image data, based on the spectral luminance value of a first wavelength band and the spectral luminance value of a second wavelength band different from the first wavelength band. This device works out the relationship between the normalized index value and the frequency of appearance for every pixel, works out a normalized index value that maximizes the degree of separation, which is the ratio of the intra-class variance to the inter-class variance, by a discriminant analysis method, and determines the worked-out normalized index value as a threshold value for identifying a pixel. This device then extracts a region of the image data differentiated by the first and second wavelength bands, based on the normalized index value associated with the threshold value.

PTL 2 discloses an image projection device that calculates a threshold value for binarizing a captured image to thereby calculate information relating to correction of an image to be projected. This device projects a calibration image onto a projection target object, and captures an image of a region including the projection target object on which the calibration image is projected. This device calculates a plurality of first threshold values associated with a plurality of first segmented regions obtained by segmenting the region, based on the captured image, and generates a binary image relating to the captured image, based on the calculated first threshold values. This device then extracts the corresponding point between the calibration image and the binary image.

PTL 3 discloses a character display region detection device that detects a character display region displayed in a screen, with a simple configuration. This device extracts edge image data for each frame. This device compares the magnitude of edge luminance for each pixel with respect to respective pieces of edge image data of a plurality of consecutive frames, and outputs still edge image data constituted by the minimum value of edge luminance associated with each pixel. This device binarizes still edge image data and acquires display region information from the binarized edge image data.

PTL 4 discloses an image processing device that performs correction processing on an image according to the layout of a subject. This device detects an image region indicating the subject in the image and confirms the layout of the subject in the image, based on the detected image region. This device determines a weighting pattern for the detected image region, based on the layout of the subject. This device then merges an image after first correction processing is performed, with an image after second correction processing is performed, in accordance with the determined weighting pattern.

PTL 5 discloses a target identification device configured to objectively and quantitatively perform comparison and evaluation between a target and a reference object. This device generates an image of the target by executing image processing on a radar image generated based on a signal received by a radar receiver, based on distance resolution. This device computes the orientation and feature amount of the target, based on the image of the target. This device generates a reference image using three-dimensional data of a predetermined target candidate, based on the orientation and the like of the target, and computes the feature amount of the target candidate, based on the generated reference image. This device then compares the feature amount of the target with the feature amount of the target candidate, and outputs the result of the comparison as an identification result.

CITATION LIST

Patent Literature

[PTL 1] JP 2013-089021 A
[PTL 2] JP 2013-065277 A
[PTL 3] JP 2009-093472 A
[PTL 4] JP 2008-147978 A
[PTL 5] JP 2000-275338 A

Non Patent Literature

[NPL 1] Xiangguang Leng, Kefeng Ji, Shilin Zhou, Xiangwei Xing, Huanxin Zou, "An Adaptive Ship Detection Scheme for Spaceborne SAR Imagery", Sensors 16 (9): 1345 (2016 September).
[NPL 2] Gui Gao, Kewei Ouyang, Yongbo Luo, Sheng Liang, and Shilin Zhou, "Scheme of Parameter Estimation for Generalized Gamma Distribution and Its Application to Ship Detection in SAR Images", IEEE TRANSACTIONS ON GEOSCIENCE AND REMOTE SENSING, VOL. 55, NO. 3, pp. 1812-1832, MARCH 2017.

SUMMARY OF INVENTION

Technical Problem

For example, in the general land mask image generation technology indicated by NPL 1, the entire image obtained by remote sensing, such as the SAR image, is binarized with one threshold value. For this reason, in a case where, for example, the characteristics such as the strength of backscattering differ for each local region in the ocean surface region, there is a possibility that the accuracy of the generated land mask image is deteriorated because the ocean surface region and the land surface region cannot be properly differentiated with one threshold value. Conceivable cases as such an example include a case where the way of wave swelling differs for each local region in the SAR image due to the weather or terrain conditions.

Therefore, the land mask image generation technology has a problem in generating the land mask image with high accuracy even when the characteristics differ for each local region in the SAR image. It cannot be said that the technologies indicated by the above-mentioned PTLs 1 to 5 are sufficient to solve this problem. It is a principal object of the invention of the present application to provide an image processing device and the like that solve this problem.

Solution to Problem

An image processing device according to one aspect of the invention of the present application includes: a segmentation means for segmenting an input image representing a result of observing an ocean surface region and a land surface region from overhead into ocean surface block images representing the ocean surface region and land surface block images representing the land surface region, based on a predetermined segmentation criterion; a first determination means for determining a binarization criterion for the ocean surface block images, based on a scattering model for electromagnetic waves in the ocean surface region; a second determination means for determining a binarization criterion for the land surface block images, based on the binarization criterion for the ocean surface block images and a positional relationship between the ocean surface block images and the land surface block images; and a generation means for generating a land mask image for differentiating between the ocean surface region and the land surface region by performing binarization processing on the input image based on the binarization criterion for the ocean surface block images and the binarization criterion for the land surface block images.

In another mode for achieving the above object, an image processing method according to one aspect of the invention of the present application is implemented by an information processing device, the image processing method including: segmenting an input image representing a result of observing an ocean surface region and a land surface region from overhead into ocean surface block images representing the ocean surface region and land surface block images representing the land surface region, based on a predetermined segmentation criterion; determining a binarization criterion for the ocean surface block images, based on a scattering model for electromagnetic waves in the ocean surface region; determining a binarization criterion for the land surface block images, based on the binarization criterion for the ocean surface block images and a positional relationship between the ocean surface block images and the land surface block images; and generating a land mask image for differentiating between the ocean surface region and the land surface region by performing binarization processing on the input image based on the binarization criterion for the ocean surface block images and the binarization criterion for the land surface block images.

In still another mode for achieving the above object, an image processing program according to one aspect of the invention of the present application is a program for causing a computer to implement: a segmentation function of segmenting an input image representing a result of observing an ocean surface region and a land surface region from overhead into ocean surface block images representing the ocean surface region and land surface block images representing the land surface region, based on a predetermined segmentation criterion; a first determination function of determining a binarization criterion for the ocean surface block images, based on a scattering model for electromagnetic waves in the ocean surface region; a second determination function of determining a binarization criterion for the land surface block images, based on the binarization criterion for the ocean surface block images and a positional relationship between the ocean surface block images and the land surface block images; and a generation function of generating a land mask image for differentiating between the ocean surface region and the land surface region by performing binarization processing on the input image based on the binarization criterion for the ocean surface block images and the binarization criterion for the land surface block images.

The invention of the present application can also be implemented by a computer-readable nonvolatile recording medium having the image processing program (computer program) stored thereon.

Advantageous Effects of Invention

The invention of the present application enables an improvement in the accuracy in generating a land mask image for differentiating between an ocean surface region and a land surface region in remote sensing technology.

BRIEF DESCRIPTION OF DRAWINGS

FIG. 2 is a graph exemplifying the distribution of pixel values for an ocean surface region distributed in accordance with generalized gamma distribution.

FIG. 3A is a flowchart (1/2) illustrating an operation of the image processing device 10 according to the first example embodiment of the invention of the present application.

FIG. 7 is a block diagram illustrating a configuration of an information processing device 900 capable of executing the image processing device according to each example embodiment of the invention of the present application.

EXAMPLE EMBODIMENT

Hereinafter, example embodiments of the invention of the present application will be described in detail with reference to the drawings.

First Example Embodiment

Figure 1:
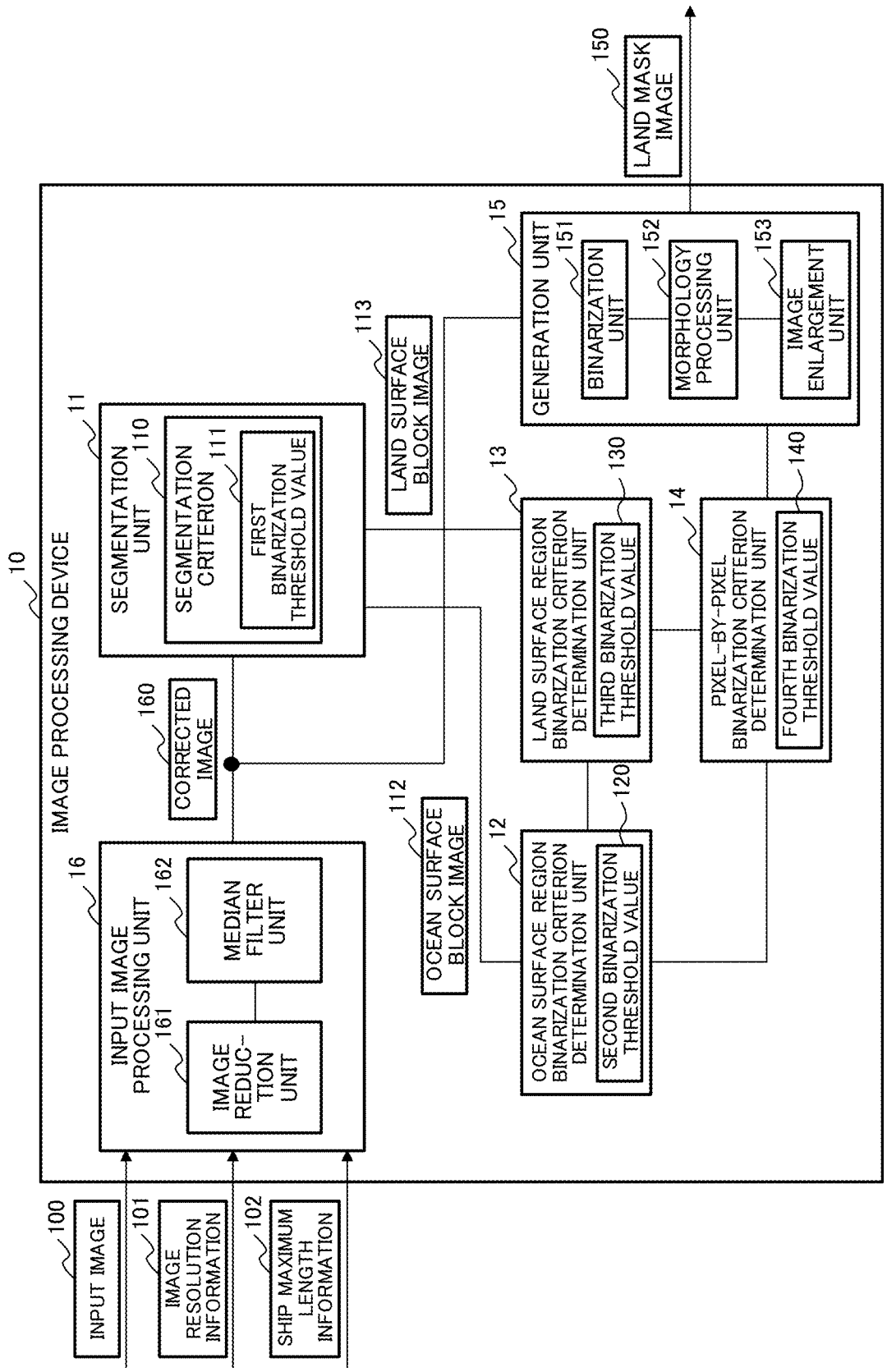
FIG. 1 is a block diagram illustrating a configuration of an image processing device 10 according to a first example embodiment of the invention of the present application.

FIG. 1 is a block diagram conceptually illustrating a configuration of an image processing device 10 according to a first example embodiment of the invention of the present application. The image processing device 10 is a device that generates a land mask image 150 for differentiating between an ocean surface region and a land surface region, based on an input image 100 representing a result of observing the ocean surface region and the land surface region from overhead, in order to analyze the input image 100.

The image processing device 10 includes a segmentation unit 11, an ocean surface region binarization criterion determination unit (first determination unit) 12, a land surface region binarization criterion determination unit (second determination unit) 13, a pixel-by-pixel binarization criterion determination unit (third determination unit) 14, a generation unit 15, and an input image processing unit 16.

The input image 100, image resolution information 101, and ship maximum length information 102 are input to the input image processing unit 16 from the outside. The input image 100 is, for example, an SAR image representing the observation result by an SAR. The image resolution information 101 is information indicating the resolution relating to the input image 100, and is, for example, information accompanying the input image 100. The image resolution information 101 corresponds to an actual length represented by one pixel included in the input image 100, for example. The ship maximum length information 102 is information indicating the maximum length in a longitudinal direction relating to a ship (the largest total length of a ship) that is likely to be present in the ocean surface region indicated by the input image 100, and the value of the ship maximum length information 102 may be set by a user, based on, for example, statistical information relating to ships that navigate this ocean surface region.

In more detail, the input image processing unit 16 includes an image reduction unit 161 and a median filter unit 162.

The image reduction unit 161 reduces the input image 100 in such a way that an image corresponding to a region representing a ship included in the input image 100 has one pixel, based on the image resolution information 101 and the ship maximum length information 102. That is, when a value indicated by the image resolution information 101 is assumed as R and a value indicated by the ship maximum length information 102 is assumed $W_{max}$, the image reduction unit 161 reduces the input image 100 to $R/W_{max}$ (where "/" denotes an operator representing the division) in an X-axis direction and a Y-axis direction in an XY plane (two-dimensional coordinate system). More specifically, for example, when R is 10 meters (m) and $W_{max}$ is 60 m, the image reduction unit 161 reduces the input image 100 to ⅙ in the X-axis direction and the Y-axis direction.

The median filter unit 162 generates a corrected image 160 by subjecting the input image 100 reduced by the image reduction unit 161 to image processing using a median filter of, for example, 3×3 pixels (where "×" denotes an operator representing the multiplication). The median filter unit 162 may use a median filter of 5×5 pixels or the like. In the input image 100 reduced by the image reduction unit 161, since the region representing the ship has one pixel or less, the corrected image 160 subjected to the image processing using the median filter is in a state in which the region representing the ship is removed.

The segmentation unit 11 segments the corrected image 160 generated by the input image processing unit 16 as described above into block images (partial images) having a predetermined size, based on a segmentation criterion 110. Note that, it is assumed that the segmentation criterion 110 is stored in a storage device such as a memory included in the image processing device 10. The segmentation unit 11 allocates, to each block image, information capable of specifying the position and the size in the corrected image 160 relating to each block image. As information that specifies the position of each block image, the segmentation unit 11 may use XY coordinates or the like representing the position of a pixel closest to the origin of the XY plane representing the position of the corrected image 160, which is included in each block image, for example.

The segmentation unit 11 performs binarization processing on the pixels constituting the corrected image 160, based on a first binarization threshold value 111 indicated by the segmentation criterion 110. The first binarization threshold value 111 may be a predetermined value determined by a user or a value determined by the segmentation unit 11 using a general discriminant analysis method (binarization of Otsu), for example.

Then, the segmentation unit 11 sorts the block images segmented as described above into ocean surface block images 112 and land surface block images 113, based on the result of the binarization processing performed on the pixels constituting the corrected image 160. The ocean surface block image 112 is a block image representing a region estimated to be included in the ocean surface region in the corrected image 160, and the land surface block image 113 is a block image representing a region estimated to be included in the land surface region in the corrected image 160. The segmentation unit 11 inputs information relating to the ocean surface block images 112 to the ocean surface region binarization criterion determination unit 12, and inputs information relating to the land surface block images 113 to the land surface region binarization criterion determination unit 13. The operation of the segmentation unit 11 will be described in detail later.

The ocean surface region binarization criterion determination unit 12 calculates (determines) a second binarization threshold value 120 representing a binarization criterion for each ocean surface block image 112, based on a scattering model for electromagnetic waves at the ocean surface. This second binarization threshold value 120 is information that serves as a basis for information used when the generation unit 15, which will be described later, generates the land mask image 150. The ocean surface region binarization criterion determination unit 12 stores the calculated second binarization threshold value 120 in a storage device such as a memory included in the image processing device 10, for example. The operation of the ocean surface region binarization criterion determination unit 12 will be described in detail later.

The land surface region binarization criterion determination unit 13 calculates (determines) a third binarization threshold value 130 representing a binarization criterion for each land surface block image 113, based on the second binarization threshold value 120 calculated by the ocean surface region binarization criterion determination unit 12 and the positional relationship between the ocean surface block images 112 and the land surface block images 113. This third binarization threshold value 130 is information that serves as a basis for information used when the generation unit 15, which will be described later, generates the land mask image 150. The land surface region binarization criterion determination unit 13 stores the calculated third binarization threshold value 130 in a storage device such as a memory included in the image processing device 10, for example. The operation of the land surface region binarization criterion determination unit 13 will be described in detail later.

The pixel-by-pixel binarization criterion determination unit 14 calculates a value $\tau_x$ of a fourth binarization threshold value 140 representing a binarization criterion for each pixel A included in the corrected image 160, based on the second binarization threshold value 120 calculated by the ocean surface region binarization criterion determination unit 12 and the third binarization threshold value 130 calculated by the land surface region binarization criterion determination unit 13, in line with formula 1.

$$\tau_x \tau_p, x \in \Omega_p \qquad \text{(Formula 1)}$$

In formula 1, $\tau_p$ represents a binarization threshold value for a block image P included in the corrected image 160, and $\Omega_p$ represents a set of pixels belonging to the block image P. The sign "$\epsilon$" is a sign representing that the element on the left side belongs to a set on the right side. That is, when the block image P is the ocean surface block image 112, $\tau_p$ is given as the second binarization threshold value 120 calculated by the ocean surface region binarization criterion determination unit 12, and when the block image P is the land surface block image 113, $\tau_p$ is given as the third binarization threshold value 130 calculated by the land surface region binarization criterion determination unit 13. In order to avoid a sudden change in the binarization threshold values relating to pixels at the boundary between the block images, the pixel-by-pixel binarization criterion determination unit 14 may use, for example, a low-pass filter when calculating the fourth binarization threshold value 140 for a pixel located in the periphery of the boundary.

The generation unit 15 generates the land mask image 150 based on the corrected image 160 generated by the input image processing unit 16 and the fourth binarization threshold value 140 calculated by the pixel-by-pixel binarization criterion determination unit 14. In more detail, the generation unit 15 includes a binarization unit 151, a morphology processing unit 152, and an image enlargement unit 153.

The binarization unit 151 calculates a class $B2_x$ of the pixel A after the binarization processing is performed, by performing the binarization processing on the pixel A included in the corrected image 160 in line with formula 2 using the fourth binarization threshold value 140 calculated in line with formula 1.

$$B2_x = \begin{cases} 1 & I_x \geq \tau_x \\ 0 & \text{otherwise} \end{cases}, \qquad \text{(Formula 2)}$$

In formula 2, $I_x$ represents the pixel value of the pixel A in the corrected image 160 before the binarization processing is performed. The sign "$\geq$" is a sign representing that the value on the left side is equal to or greater than the value on the right side. That is, when the pixel value $I_x$ of the pixel A constituting the corrected image 160 is equal to or greater than the value $\tau_x$ of the fourth binarization threshold value 140, the binarization unit 151 performs the binarization processing by assigning "1" in binarization to the class of the pixel A, and when the pixel value $I_x$ of the pixel A constituting the corrected image 160 is less than the value $\tau_x$ of the fourth binarization threshold value 140, the binarization unit 151 performs the binarization processing by assigning "0" in binarization to the class of the pixel A.

The morphology processing unit 152 performs morphology processing of removing an isolated point, filling a hole, and the like on the result of binarizing the corrected image 160 by the binarization unit 151. Since the morphology processing is a well-known technology including opening processing, closing processing, filling processing, and the like used in general image processing, a detailed description thereof will be omitted in the present application.

The image enlargement unit 153 performs processing of enlarging the corrected image 160 processed by the binarization unit 151 and the morphology processing unit 152 as described above, in such a way that the input image 100 has the same size as the size before being reduced by the image reduction unit 161. That is, since the input image 100 is reduced to $R/W_{max}$ in the X-axis direction and the Y-axis direction by the image reduction unit 161 as described above, the image enlargement unit 153 enlarges the corrected image 160 processed by the binarization unit 151 and the morphology processing unit 152 as described above, to $W_{max}/R$ in the X-axis direction and the Y-axis direction.

The image enlargement unit 153 can use, for example, a nearest neighbor method as an algorithm of this enlargement processing. Alternatively, when using a weighted sum of pixels by a linear interpolation method or the like, the image enlargement unit 153 may perform the binarization processing on the enlarged image by assigning "0.5" as a threshold value, for example. The image enlargement unit 153 outputs the image on which the enlargement processing has been performed as described above, to the outside as the land mask image 150.

Next, the operation of the segmentation unit 11, the ocean surface region binarization criterion determination unit 12, and the land surface region binarization criterion determination unit 13 will be individually described in detail.

Segmentation Unit 11

The segmentation unit 11 calculates a class $B1_x$ of the pixel A after the binarization processing is performed, by performing the binarization processing on the pixel A constituting the corrected image 160 in line with formula 3 using the first binarization threshold value 111.

$$B1_x = \begin{cases} 1 & I_x \geqq \tau_0 \\ 0 & \text{otherwise} \end{cases}, \quad \text{(Formula 3)}$$

In formula 3, $\tau_0$ represents the value of the first binarization threshold value 111.

When determining the first binarization threshold value 111 using, for example, a general discriminant analysis method (binarization of Otsu), the segmentation unit 11 searches for a threshold value $\tau$ that maximizes the value indicated by formula 4 when the corrected image 160 is binarized with a certain threshold value $\tau$, and determines the threshold value $\tau$ at that time as the value $\tau_0$ of the first binarization threshold value 111.

$$\mu_0 \mu_1 (\omega_0 - \omega_1)^2 \quad \text{(Formula 4)}$$

In formula 4, $\omega_0$ and $\omega_1$ represent the numbers of pixels to be assigned as a class 0 and a class 1, respectively, in the binarization with the certain threshold value $\tau$, and $\mu_0$ and $\mu_1$ represent the average values of the pixel values of the pixels to be assigned as the class 0 and class 1, respectively, in the binarization with the certain threshold value $\tau$. The segmentation unit 11 is only required to perform the search described above by, for example, setting the threshold value $\tau$ according to a proper grain size (for example, eight bits or ten bits) and making a search comprehensively.

The segmentation unit 11 sorts the segmented block images into the ocean surface block images 112 and the land surface block images 113, based on the result of the binarization processing performed on the pixels constituting the corrected image 160. Here, the number of pixels constituting each block image is assumed as $N_B$, and the number of pixels estimated to be included in the land surface region among the pixels constituting each block image is assumed as $N_L$. Note that the pixels estimated to be included in the land surface region correspond to the pixels to be assigned as the class 1 as a result of the binarization processing performed as described above.

The segmentation unit 11 performs the sorting described above using a predetermined (first) false alarm rate $P_{FA}$. The false alarm rate $P_{FA}$ represents the probability of the occurrence of an error when a region including the pixels is estimated. That is, when $N_L$ has a value equal to or smaller than the product of $P_{FA}$ and $N_B$ with respect to a certain block image, the segmentation unit 11 verifies the certain block image as the ocean surface block image 112, and when $N_L$ has a value greater than the product of $P_{FA}$ and $N_B$, the segmentation unit 11 verifies the certain block image as the land surface block image 113. More specifically, for example, when the size of the segmented block image is 100×100 pixels (that is, 10,000 pixels) and the $P_{FA}$ is 0.001, the segmentation unit 11 verifies a block image whose $N_L$ is 10 (=10,000×0.001) or less, as the ocean surface block image 112.

Ocean Surface Region Binarization Criterion Determination Unit 12

In the input image 100, which is, for example, the SAR image, the distribution (probability density distribution) of pixel values in the ocean surface region is known to follow a generalized gamma distribution as illustrated in, for example, FIG. 2. The ocean surface region binarization criterion determination unit 12 calculates such a threshold value $\tau$ that satisfies formula 5, as the second binarization threshold value 120 by utilizing such distribution characteristics of pixel values in the ocean surface region.

$$P_{FA} = 1.0 - \int_{-\infty}^{\tau} f_{G\text{-}Gamma}(x) dx \quad \text{(Formula 5)}$$

In formula 5, $P_{FA}$ denotes a predetermined (second) false alarm rate, which may be the same value as or a different value from the false alarm rate used by the segmentation unit 11 described above. In addition, $f_{G\text{-}GAMMA}$ represents the probability density function of the generalized gamma distribution. In formula 5, "∫" denotes an operator representing the integral.

The probability density function $f_{G\text{-}GAMMA}$ of the generalized gamma distribution can be expressed as formula 6, as indicated by NPL 2.

$$F_{G\text{-}Gamma}(x) = \frac{|v|k^k}{\sigma \Gamma(k)} \left(\frac{x}{\sigma}\right)^{kv-1} \exp\left\{-k\left(\frac{x}{\sigma}\right)^v\right\} \quad \text{(Formula 6)}$$

In formula 6, "Γ" represents the gamma function, and "exp" represents the natural exponential function.

Parameters k, σ, and v included in formula 6 can be worked out as indicated by formulas 7 to 11, based on observation data $\{x_i\}$, $i \in [1, N]$ relating to N (N is any natural number) pixel values, as indicated by NPL 2.

$$\begin{cases} \hat{c}_1 = \frac{1}{N}\sum_{i=1}^{N} \ln x_i \\ \hat{c}_2 = \frac{1}{N}\sum_{i=1}^{N} (\ln x_i - \hat{c}_1)^2 \\ \hat{c}_3 = \frac{1}{N}\sum_{i=1}^{N} (\ln x_i - \hat{c}_1)^3 \end{cases}$$ (Formula 7)

$$\lambda = \frac{\hat{c}_2^3}{\hat{c}_3^2}$$ (Formula 8)

$$\begin{cases} a = \frac{3}{2} - \lambda \\ b = \frac{3}{4} - 2\lambda \\ c = \frac{1}{8} - \lambda \end{cases}$$ (Formula 9)

$$\begin{cases} \pi = b - \frac{a^2}{3} \\ \phi = \frac{2}{27}a^3 - \frac{ab}{3} + c \end{cases}$$ (Formula 10)

$$\begin{cases} k = -\frac{a}{3} + \sqrt[3]{-\frac{\phi}{2} + \sqrt{\left(\frac{\phi}{2}\right)^2 + \left(\frac{\pi}{3}\right)^3}} + \sqrt[3]{-\frac{\phi}{2} - \sqrt{\left(\frac{\phi}{2}\right)^2 + \left(\frac{\pi}{3}\right)^3}} \\ v = sgn(-\hat{c}_3)\sqrt{\frac{\Psi(1, k)}{\hat{c}_2}} \\ \sigma = \exp\left\{\hat{c}_1 - \frac{\Psi(k) - \ln k}{v}\right\} \end{cases}$$ (Formula 11)

In formula 7, "ln" denotes an operator representing the natural logarithm. In formula 11, "√" denotes an operator representing the square root. In formula 11, "sgn" represents the sign function, "$\Psi(k)$" represents the digamma function, and "$\Psi(1, k)$" represents the first-order polygamma function.

Land Surface Region Binarization Criterion Determination Unit 13

The above-described land surface block image 113 sorted by the segmentation unit 11 sometimes includes many pixels included in the ocean surface region, for example, when the land surface block image 113 is a block image including a shoreline. In order to properly cope with such a case, the land surface region binarization criterion determination unit 13 calculates a value $\tau_q$ of the third binarization threshold value 130 for the land surface block image 113, based on the second binarization threshold value 120 and the positional relationship between the ocean surface block images 112 and the land surface block images 113, as indicated by, for example, formula 12.

$$\tau_q = \frac{\sum_{p \in \Omega_{Sea}} w(p, q) \times \tau_p}{\sum_{p \in \Omega_{Sea}} w(p, q)}$$ (Formula 12)

In formula 12, $\Omega_{sea}$ represents a set of ocean surface block images 112 (that is, $P \in \Omega_{sea}$ represents that the block image P is the ocean surface block image 112), and w(p, q) represents a weight based on the distance between an ocean surface block p indicated by the ocean surface block image 112 and a land surface block q indicated by the land surface block image 113.

The land surface region binarization criterion determination unit 13 may work out w(p, q) using a Gaussian function as indicated by, for example, formula 13.

$$w(p, q) = \exp\left\{-\frac{\|p - q\|^2}{2\sigma^2}\right\}$$ (Formula 13)

In formula 13, "$\|p-\|$" represents the distance between the ocean surface block p and the land surface block q, and σ denotes a parameter representing the standard deviation in the Gaussian function.

Figure 3B:
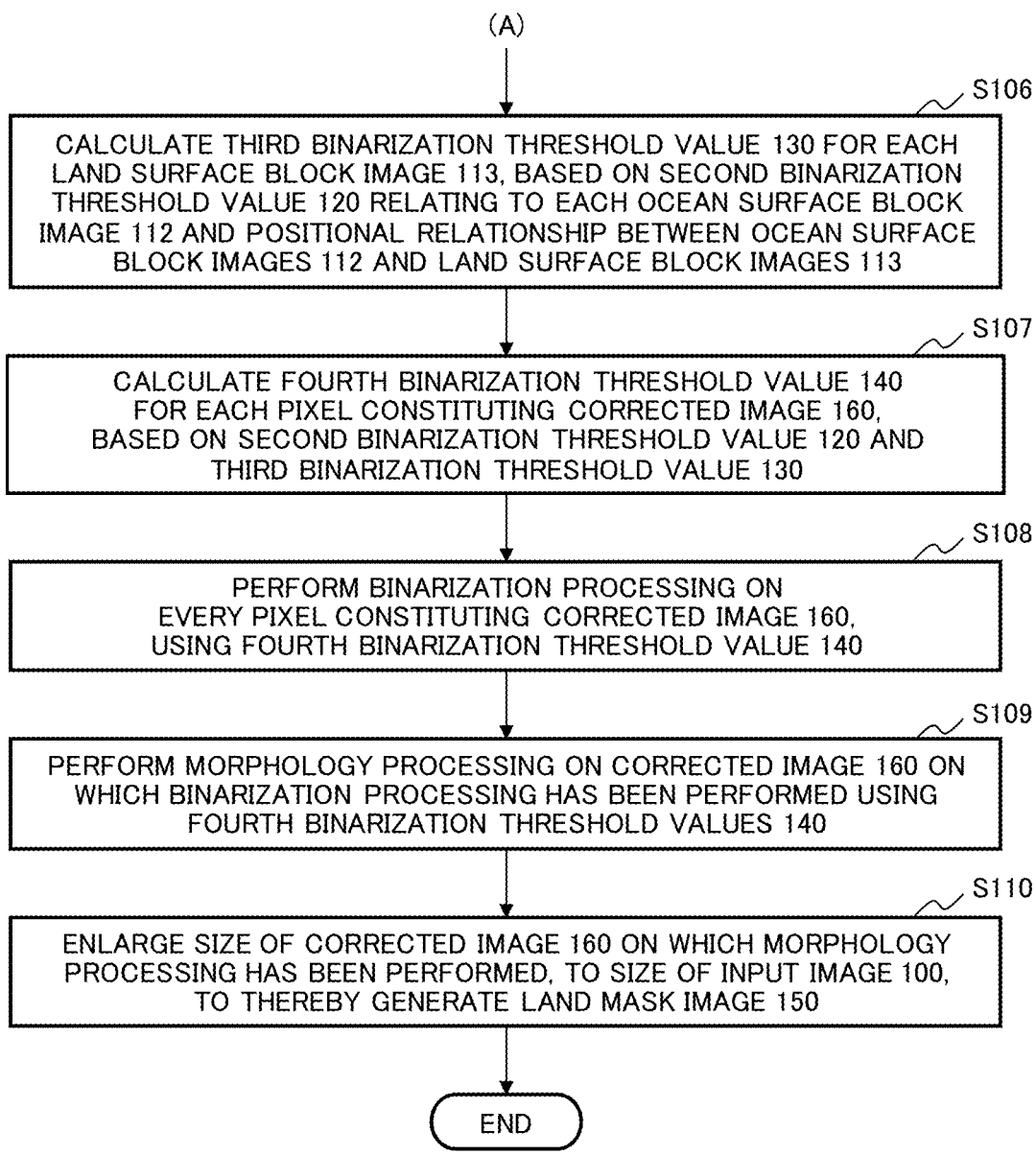
FIG. 3B is a flowchart (2/2) illustrating an operation of the image processing device 10 according to the first example embodiment of the invention of the present application.

Next, the operation (processing) of the image processing device 10 according to the present example embodiment will be described in detail with reference to the flowcharts in FIGS. 3A and 3B.

The image reduction unit 161 in the input image processing unit 16 reduces the input image 100 in such a way that an image corresponding to a ship has one pixel, based on the image resolution information 101 and the ship maximum length information 102 (step S101). The median filter unit 162 in the input image processing unit 16 applies the median filter to the reduced input image 100 to thereby generate the corrected image 160 from which the ship has been removed (step S102).

The segmentation unit 11 segments the corrected image 160 generated by the input image processing unit 16 into block images having a predetermined size, based on the segmentation criterion 110 (step S103). The segmentation unit 11 performs the binarization processing using the first binarization threshold value 111 on the pixels constituting the corrected image 160 to thereby sort the segmented block images into the ocean surface block images 112 and the land surface block images 113 (step S104).

The ocean surface region binarization criterion determination unit 12 calculates the second binarization threshold value 120 for each ocean surface block image 112, based on the scattering model for electromagnetic waves at the ocean surface and a predetermined false alarm rate (step S105). The land surface region binarization criterion determination unit 13 calculates the third binarization threshold value 130 for each land surface block image 113, based on the second binarization threshold value 120 relating to each ocean surface block image 112 and the positional relationship between the ocean surface block images 112 and the land surface block images 113 (step S106).

The pixel-by-pixel binarization criterion determination unit 14 calculates the fourth binarization threshold value 140 for each pixel constituting the corrected image 160, based on the second binarization threshold value 120 and the third binarization threshold value 130 (step S107).

The binarization unit 151 in the generation unit 15 performs the binarization processing on every pixel constituting the corrected image 160, using the fourth binarization threshold value 140 (step S108). The morphology processing unit 152 in the generation unit 15 performs the morphology processing on the corrected image 160 on which the binarization processing has been performed using the fourth binarization threshold values 140 (step S109). The image enlargement unit 153 in the generation unit 15 enlarges the size of the corrected image 160 on which the morphology processing has been performed by the morphology processing unit 152, to the size of the input image 100, to thereby generate the land mask image 150 (step S110), and then the whole processing is completed.

The image processing device 10 according to the present example embodiment can improve the accuracy in generating the land mask image for differentiating between the ocean surface region and the land surface region in remote sensing technology. The reason is that the image processing device 10 segments the input image 100 into the ocean surface block images 112 and the land surface block images 113, determines the binarization criterion for the ocean surface block images 112 based on the scattering model for electromagnetic waves in the ocean surface region, determines the binarization criterion for the land surface block images 113 based on the determined binarization criterion, and generates the land mask image 150 for the input image 100 using these determined binarization criteria.

The effects implemented by the image processing device 10 according to the present example embodiment will be described in detail below.

For example, in the general land mask image generation technology, the entire image obtained by remote sensing, such as the SAR image, is binarized with one threshold value. For this reason, in a case where, for example, the characteristics such as the strength of backscattering differ for each local region in the ocean surface region due to the weather or terrain conditions, there is a possibility that the accuracy of the generated land mask image is deteriorated because the ocean surface region and the land surface region cannot be properly differentiated with one threshold value. Therefore, the generation of the land mask image has a problem in generating the land mask image with high accuracy even when the characteristics differ for each local region in the SAR image.

To solve such a problem, the image processing device 10 according to the present example embodiment includes the segmentation unit 11, the ocean surface region binarization criterion determination unit (first determination unit) 12, the land surface region binarization criterion determination unit (second determination unit) 13, and the generation unit 15, and operates as described above with reference to, for example, FIGS. 1, 2, 3A, and 3B. That is, the segmentation unit 11 segments the input image 100 representing the result of observing the ocean surface region and the land surface region from overhead into the ocean surface block images 112 representing the ocean surface region and the land surface block images 113 representing the land surface region, based on the predetermined segmentation criterion 110. The ocean surface region binarization criterion determination unit 12 determines the binarization criterion for the ocean surface block images 112 (second binarization threshold values 120), based on the scattering model for electromagnetic waves in the ocean surface region. The land surface region binarization criterion determination unit 13 determines the binarization criterion for the land surface block images 113 (third binarization threshold values 130), based on the second binarization threshold values 120 for the ocean surface block images and the positional relationship between the ocean surface block images 112 and the land surface block images 113. Then, the generation unit 15 performs the binarization processing on the input image 100 based on the second binarization threshold values 120 and the third binarization threshold values 130 to thereby generate the land mask image 150 for differentiating between the ocean surface region and the land surface region.

That is, the image processing device 10 according to the present example embodiment sequentially determines, for each local region, the binarization criterion for the ocean surface region and the binarization criterion for the land surface region included in the input image 100, by utilizing the characteristics that the distribution of pixels constituting the ocean surface block image 112 sorted from the input image 100 follows the scattering model of electromagnetic waves in the ocean surface region. Consequently, the image processing device 10 according to the present example embodiment can generate a land mask image with higher accuracy that allows also to handle the fact that characteristics such as the strength of backscattering differ for each local region in the ocean surface region.

The image processing device 10 according to the present example embodiment also calculates the third binarization threshold value 130 for the land surface block image 113 by performing weighted addition on the second binarization threshold value 120 for the ocean surface block image 112, based on the distance between the ocean surface block image 112 and the land surface block image 113. Consequently, the image processing device 10 according to the present example embodiment determines the binarization criterion for the land surface block image 113 with high accuracy, such that the accuracy in generating the land mask image can be improved.

The image processing device 10 according to the present example embodiment also performs processing using the false alarm rate when segmenting the corrected image 160 into the ocean surface block images 112 and the land surface block images 113 or when calculating the second binarization threshold value 120 for the ocean surface block image 112. Consequently, the image processing device 10 according to the present example embodiment can improve the accuracy in generating the land mask image.

The image processing device 10 according to the present example embodiment uses a low-pass filter to calculate, in the pixel-by-pixel binarization criterion determination unit 14, the fourth binarization threshold value 140 with respect to a particular pixel located in the vicinity of the boundary between the block images, among the pixels constituting the corrected image 160. Consequently, a sudden change in the binarization threshold values relating to pixels is avoided at the boundary between the block images, and thus the image processing device 10 according to the present example embodiment can improve the accuracy in generating the land mask image.

The image processing device 10 according to the present example embodiment includes the input image processing unit 16, and generates the corrected image 160 in which the ship has been removed from the input image 100 by reducing the input image 100 and then subjecting the reduced input image 100 to processing using a median filter, to generate the land mask image 150 based on the corrected image 160. Consequently, the image processing device 10 according to the present example embodiment can further improve the accuracy in generating the land mask image.

The image processing device 10 according to the present example embodiment may adopt a simple configuration that does not include the input image processing unit 16. In this case, the image processing device 10 performs the processing described above regarding the present example embodiment on the input image 100 without generating the corrected image 160.

The image processing device 10 according to the present example embodiment also performs the morphology processing on the land mask image 150 to be generated when generating the land mask image 150 in the generation unit 15. Consequently, the image processing device 10 according to the present example embodiment can improve the accuracy in generating the land mask image.

Second Example Embodiment

Figure 4:
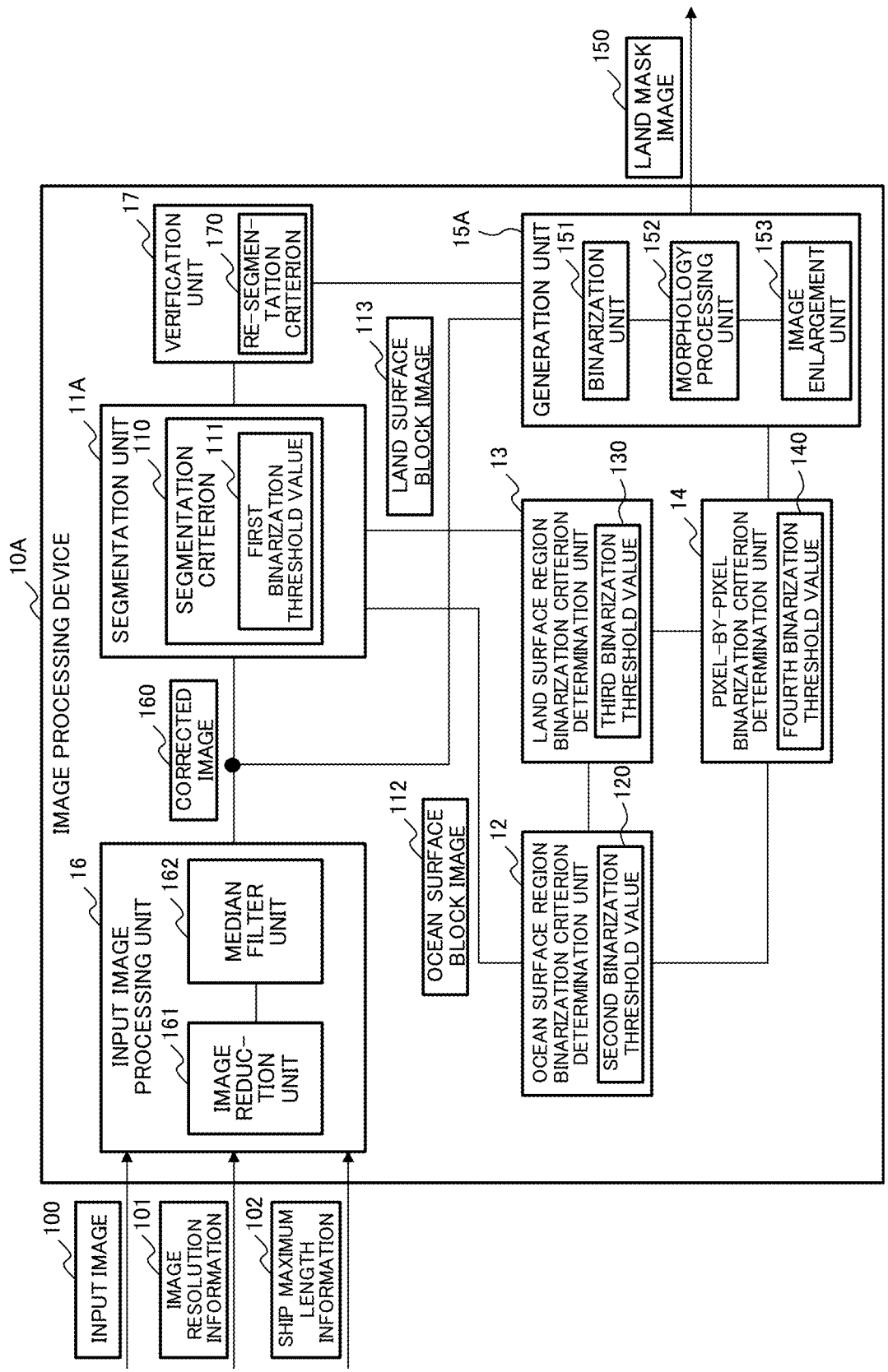
FIG. 4 is a block diagram illustrating a configuration of an image processing device 10A according to the first example embodiment of the invention of the present application.

FIG. 4 is a block diagram conceptually illustrating a configuration of an image processing device 10A according to a second example embodiment of the invention of the present application. In the present example embodiment, the same numbers as in the first example embodiment described above are allocated to components having the same functions as in the first example embodiment, and a detailed description thereof will be omitted.

The image processing device 10A according to the present example embodiment includes a segmentation unit 11A, an ocean surface region binarization criterion determination unit 12, a land surface region binarization criterion determination unit 13, a pixel-by-pixel binarization criterion determination unit 14, a generation unit 15A, an input image processing unit 16, and a verification unit 17. That is, the image processing device 10A according to the present example embodiment differs from the image processing device 10 according to the first example embodiment described above in the functions relating to the segmentation unit 11A and the generation unit 15A, and additionally includes the verification unit 17.

The verification unit 17 verifies whether the number of ocean surface block images 112 sorted by the segmentation unit 11A and the size of the block images obtained by segmenting a corrected image 160 satisfy a re-segmentation criterion 170. The re-segmentation criterion 170 is, for example, a criterion indicating that the number of the ocean surface block images 112 is smaller than a predetermined required minimum value and that the size of the block images is larger than a predetermined re-segmentable minimum value. Alternatively, the re-segmentation criterion 170 may be a more complex criterion that depends on the combination of the number of the ocean surface block images 112 and the size of the block images. It is assumed that the re-segmentation criterion 170 is stored in a storage device such as a memory included in the image processing device 10A.

When it is verified that the number of the ocean surface block images 112 and the size of the block images satisfy the re-segmentation criterion 170, the verification unit 17 inputs information to instruct the segmentation unit 11A to re-segment the corrected image 160 more finely. Upon accepting the instruction from the verification unit 17, the segmentation unit 11A more finely re-segments the corrected image 160 into block images. However, the segmentation unit 11A is assumed to perform the re-segmentation in such a way that the size of the re-segmented block images is equal to or greater than the above-mentioned re-segmentable minimum value indicated by the re-segmentation criterion 170. Then, the segmentation unit 11A performs binarization processing on the more finely re-segmented block images, based on a first binarization threshold value 111, to thereby again sort the block images into the ocean surface block images 112 and land surface block images 113.

The verification unit 17 also detects a non-re-segmentable state, which is in a state in which the number of the ocean surface block images 112 is smaller than the required minimum value and the size of the block images is equal to the above-mentioned re-segmentable minimum value. This non-re-segmentable state is a state representing that information relating to the ocean surface region necessary for generating a land mask image 150 with accuracy required at minimum is not obtained. The verification unit 17 notifies the generation unit 15A that the non-re-segmentable state has been detected.

When notified by the verification unit 17 that the above-mentioned non-re-segmentable state has been detected, the generation unit 15A generates the land mask image 150 representing that the entire input image 100 falls within the land surface region (that is, it is difficult to differentiate between the ocean surface region and the land surface region in the input image 100).

Figure 5:
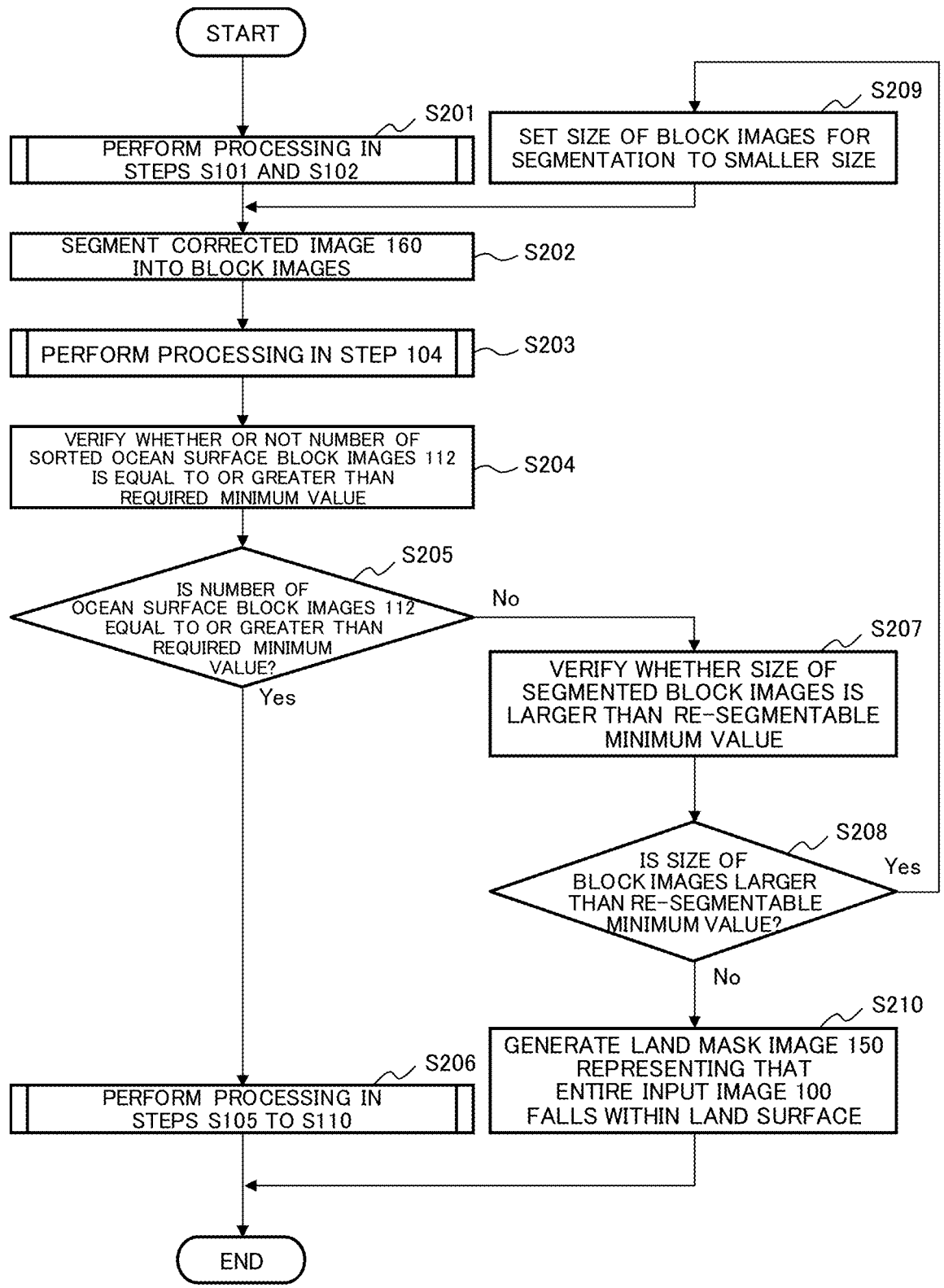
FIG. 5 is a flowchart illustrating an operation of the image processing device 10A according to a second example embodiment of the invention of the present application.

Next, the operation (processing) of the image processing device 10A according to the present example embodiment will be described in detail with reference to the flowcharts in FIG. 5.

The input image processing unit 16 performs the processing in steps S101 and S102 illustrated in FIG. 3A (step S201). The segmentation unit 11A segments the corrected image 160 into block images (step S202). The segmentation unit 11A performs the processing in step S104 illustrated in FIG. 3A (step S203).

The verification unit 17 verifies whether or not the number of the sorted ocean surface block images 112 is equal to or greater than the required minimum value indicated by the re-segmentation criterion 170 (step S204). When the number of the sorted ocean surface block images 112 is equal to or greater than the required minimum value (Yes in step S205), the image processing device 10A performs the processing in steps S105 to S110 illustrated in FIGS. 3A and 3B (step S206), and the whole processing is completed.

When the number of the sorted ocean surface block images 112 is not equal to or greater than the required minimum value (No in step S205), the verification unit 17 verifies whether the size of the segmented block images is larger than the re-segmentable minimum value indicated by the re-segmentation criterion 170 (step S207). When the size of the block images is larger than the re-segmentable minimum value (Yes in step S208), the segmentation unit 11A sets the size of the block images for segmentation to a smaller size (step S209), and the processing returns to step S202. When the size of the ocean surface block images 112 is not larger than (that is, equal to) the re-segmentable minimum value (No in step S208), the generation unit 15A generates the land mask image 150 representing that the entire input image 100 falls within the land surface (step S210), and the whole processing is completed.

The image processing device 10A according to the present example embodiment can improve the accuracy in generating the land mask image for differentiating between the ocean surface region and the land surface region in remote sensing technology. The reason is as described in the first example embodiment.

When the number of the ocean surface block images 112 does not reach the required minimum value and the size of the segmented block images is larger than the re-segmentable minimum value, the image processing device 10A according to the present example embodiment re-segments the corrected image 160 more finely and sorts the more finely re-segmented block images into the ocean surface block images 112 and the land surface block images 113.

The status in which the number of the ocean surface block images 112 generated by the segmentation unit 11A does not reach the required minimum value means that the grain size for segmentation is too large not to sufficiently cope with determining the binarization criterion by taking into account the difference in characteristics for each local region in the ocean surface region. When the grain size for segmentation is made finer than necessary, an enormous amount of computation is required to calculate the binarization threshold values, such that it is also necessary to put a limit on the fineness of the grain size for segmentation with respect to the size of the segmented block images, by setting the re-segmentable minimum value. The image processing device 10A according to the present example embodiment can improve the accuracy in generating the land mask image efficiently and reliably by taking such a background into account.

Instead of the number of the ocean surface block images 112, the image processing device 10A according to the present example embodiment may compare, for example, the number of pixels of the ocean surface region constituting the ocean surface block image 112 with a required minimum value relating to the number of pixels of the ocean surface region.

In the image processing device 10A according to the present example embodiment, the target to be re-segmented more finely may be limited to the land surface block images 113 among the block images. That is, the image processing device 10A can efficiently obtain a larger number of the ocean surface block images 112 by extracting finer ocean surface block images 112 from the land surface block images 113, thereby being able to improve the accuracy in generating the land mask images more efficiently.

The image processing device 10A according to the present example embodiment also detects the non-re-segmentable state, which is in a state in which the number of the ocean surface block images 112 is smaller than the required minimum value and the size of the block images is equal to the re-segmentable minimum value, and generates the land mask image 150 representing that the entire input image 100 falls within the land surface region, when the non-re-segmentable state is detected. Consequently, the image processing device 10A according to the present example embodiment can avoid an imprecise analysis of the input image 100 from being performed in remote sensing technology due to using the land mask image 150 that does not have the minimum necessary accuracy.

Third Example Embodiment

Figure 6:
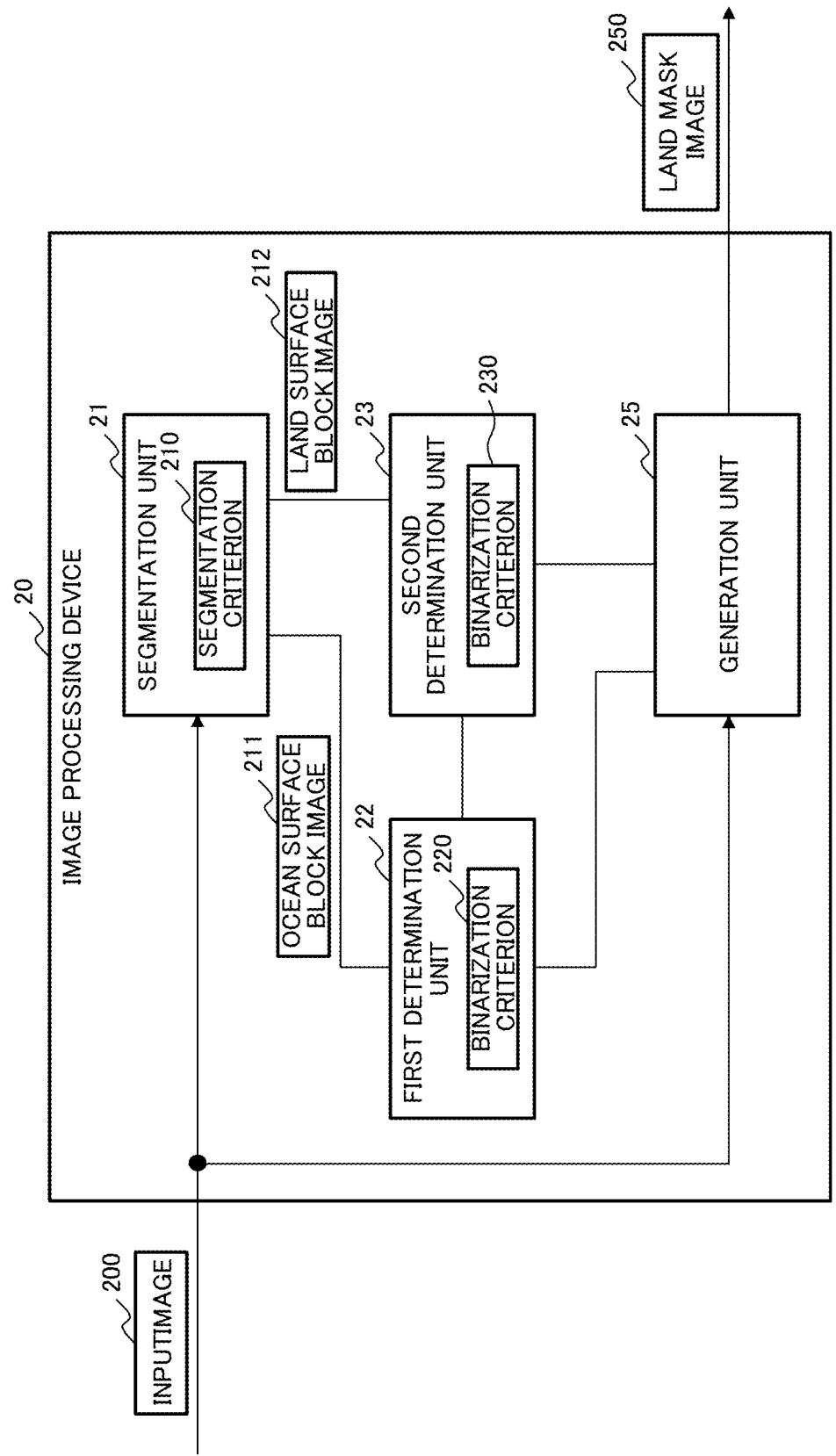
FIG. 6 is a flowchart illustrating an operation of an image processing device 20 according to a third example embodiment of the invention of the present application.

FIG. 6 is a block diagram conceptually illustrating a configuration of an image processing device 20 according to a third example embodiment of the invention of the present application. The image processing device 20 includes a segmentation unit 21, a first determination unit 22, a second determination unit 23, and a generation unit 25.

The segmentation unit 21 segments an input image 200 representing the result of observing the ocean surface region and the land surface region from overhead into ocean surface block images 211 representing the ocean surface region and land surface block images 212 representing the land surface region, based on a predetermined segmentation criterion 210.

The first determination unit 22 determines a binarization criterion 220 for the ocean surface block images 211, based on a scattering model for electromagnetic waves in the ocean surface region.

The second determination unit 23 determines a binarization criterion 230 for the land surface block images 212, based on the binarization criterion 220 for the ocean surface block images 211 and the positional relationship between the ocean surface block images 211 and the land surface block images 212.

The generation unit 25 performs binarization processing on the input image 200 based on the binarization criterion 220 for the ocean surface block images 211 and the binarization criterion 230 for the land surface block images 212 to thereby generate a land mask image 250 for differentiating between the ocean surface region and the land surface region.

The image processing device 20 according to the present example embodiment can improve the accuracy in generating the land mask image for differentiating between the ocean surface region and the land surface region in remote sensing technology. The reason is that the image processing device 20 segments the input image 200 into the ocean surface block images 211 and the land surface block images 212, determines the binarization criterion 220 for the ocean surface block images 211 based on the scattering model of electromagnetic waves in the ocean surface region, determines the binarization criterion 230 for the land surface block images 212 based on the binarization criterion 220, and generates the land mask image 250 for the input image 200 using these determined binarization criteria.

Hardware Configuration Example

Each member of the image processing devices illustrated in FIGS. 1, 4, and 6 in the above-described respective example embodiments can be implemented by dedicated hardware (HW) (electronic circuit). In FIGS. 1, 4, and 6, at least the following components can be considered as functional (processing) units (software modules) of a software program.

Segmentation units 11, 11A, and 21,
Ocean surface region binarization criterion determination unit 12, first determination unit 22,
Land surface region binarization criterion determination unit 13, second determination unit 23,
Pixel-by-pixel binarization criterion determination unit 14,
Generation units 15, 15A, and 25,
Input image processing unit 16, and
Verification unit 17.

However, the division between these respective members illustrated in the drawings is for a configuration for convenience of explanation, and a variety of configurations can be presumed when actually equipped. An example of the hardware environment in this case will be described with reference to FIG. 7.

FIG. 7 is a diagram illustratively explaining a configuration of an information processing device 900 (computer) capable of executing the image processing device according to each example embodiment of the invention of the present application. That is, FIG. 7 represents a configuration of a computer (information processing device) capable of implementing the image processing devices 10, 10A, and 20 illustrated in FIGS. 1, 4, and 6, which is a hardware environment capable of implementing each function in the above-described example embodiments.

The information processing device 900 illustrated in FIG. 7 includes the following members as constituent elements.

Central processing unit (CPU) 901,
Read only memory (ROM) 902,
Random access memory (RAM) 903,
Hard disk (storage device) 904,
Communication interface 905 with external device,
Bus 906 (communication line),
Reader/writer 908 capable of reading and writing data stored in recording medium 907 such as compact disc read only memory (CD-ROM), and
Input/output interface 909 such as monitor, speaker, and keyboard.

That is, the information processing device 900 including the above constituent elements is a general computer in which these components are connected via the bus 906. The information processing device 900 includes a plurality of CPUs 901 or a CPU 901 constituted by a multi-core in some cases.

Then, the invention of the present application described using the above-described example embodiments as examples supplies a computer program capable of implementing the following functions to the information processing device 900 illustrated in FIG. 7. The functions are functions of the above-described components in the block configuration diagrams (FIGS. 1, 4 and 6) referred to in the description of the example embodiments or functions in the flowcharts (FIGS. 3A, 3B, and 5). The invention of the present application is achieved by thereafter reading, interpreting, and executing the supplied computer program in the CPU 901 of the hardware. The computer program supplied into the device can be stored in a readable and writable volatile memory (RAM 903) or a nonvolatile storage device such as the ROM 902 or the hard disk 904.

In the case described above, a general procedure in the present day can be adopted as a method of supplying the computer program into the hardware. Examples of the procedure include a method of installing the computer program into the device via various recording media 907 such as a CD-ROM, and a method of downloading the computer program from the outside via a communication line such as the Internet. Then, in such a case, the invention of the present application can be considered to be constituted by a code constituting the computer program or the recording medium 907 in which the above code is stored.

The invention of the present application has been described above with reference to the above-described example embodiments as typical examples. However, the invention of the present application is not restricted to the example embodiments described above. That is, the invention of the present application can apply a variety of aspects that can be understood by those skilled in the art, within the scope of the invention of the present application.

Some or all of the example embodiments described above can also be described as in the following supplementary notes. However, the invention of the present application described illustratively according to the above example embodiments is not limited to the following.

Supplementary Note 1

An image processing device including:
a segmentation means for segmenting an input image representing a result of observing an ocean surface region and a land surface region from overhead into ocean surface block images representing the ocean surface region and land surface block images representing the land surface region, based on a predetermined segmentation criterion;
a first determination means for determining a binarization criterion for the ocean surface block images, based on a scattering model for electromagnetic waves in the ocean surface region;
a second determination means for determining a binarization criterion for the land surface block images, based on the binarization criterion for the ocean surface block images and a positional relationship between the ocean surface block images and the land surface block images; and
a generation means for generating a land mask image for differentiating between the ocean surface region and the land surface region by performing binarization processing on the input image based on the binarization criterion for the ocean surface block images and the binarization criterion for the land surface block images.

Supplementary Note 2

The image processing device according to supplementary note 1, in which the segmentation means segments the input image into block images having a predetermined size and then sorts the block images into the ocean surface block images and the land surface block images by performing binarization processing on pixels constituting the block images, based on a first binarization threshold value indicated by the predetermined segmentation criterion.

Supplementary Note 3

The image processing device according to supplementary note 2, further including a verification means for verifying whether a number of the ocean surface block images sorted by the segmentation means and a size of the block images satisfy a re-segmentation criterion that has been predetermined, in which
when the verification means verifies that the number of the ocean surface block images and the size of the block images satisfy the re-segmentation criterion, the segmentation means more finely re-segments the input image into the block images and then sorts the block images re-segmented more finely into the ocean surface block images and the land surface block images.

Supplementary Note 4

The image processing device according to supplementary note 3, in which the segmentation means limits a target to be re-segmented more finely to the land surface block images among the block images.

Supplementary Note 5

The image processing device according to supplementary note 3 or 4, in which the re-segmentation criterion indicates that the number of the ocean surface block images is smaller than a required minimum value that has been predetermined and that the size of the block images is larger than a re-segmentable minimum value that has been predetermined.

Supplementary Note 6

The image processing device according to supplementary note 5, in which the verification means detects a non-re-segmentable state, in which the number of the ocean surface block images is smaller than the required minimum value and the size of the block images is equal to the re-segmentable minimum value, and the generation means generates the land mask image representing that the entire input image falls within the land surface region, when the verification means detects the non-re-segmentable state.

Supplementary Note 7

The image processing device according to any one of supplementary notes 1 to 6, in which the second determination means calculates third binarization threshold values indicated by the binarization criterion for the land surface block images by performing weighted addition on second binarization threshold values indicated by the binarization criterion for the ocean surface block images, based on distances between the ocean surface block images and the land surface block images.

Supplementary Note 8

The image processing device according to any one of supplementary notes 2 to 7, further including a third determination means for determining a binarization criterion for each pixel included in the input image, the binarization criterion representing applying the binarization criterion for the ocean surface block images to a pixel belonging to the ocean surface block images and applying the binarization criterion for the land surface block images to a pixel belonging to the land surface block images, in which the generation means generates the land mask image by performing binarization processing on the input image based on the binarization criterion for each pixel.

Supplementary Note 9

The image processing device according to supplementary note 8, in which the third determination means uses a low-pass filter to calculate a fourth binarization threshold value representing the binarization criterion for each pixel, with respect to a particular pixel located in a vicinity of a boundary between the block images, among the pixels constituting the input image.

Supplementary Note 10

The image processing device according to any one of supplementary notes 1 to 9, in which the segmentation means segments the input image into the ocean surface block images and the land surface block images, using a first false alarm rate representing a probability of an error happening in differentiating between the land surface region and the ocean surface region, and the first determination means uses a second false alarm rate to determine the binarization criterion for the ocean surface block images.

Supplementary Note 11

The image processing device according to any one of supplementary notes 1 to 10, further including an input image processing means for reducing the input image based on a maximum value of a size of a ship that is likely to be present in the ocean surface region in such a way that an image corresponding to a region representing the ship has one pixel in the input image, and inputting, to the segmentation means and the generation means, a corrected image in which the ship has been removed from the input image by applying a median filter to the input image being reduced, in which the segmentation means sorts the corrected image into the ocean surface block images and the land surface block images, and the generation means generates the land mask image by performing binarization processing on the corrected image, based on the binarization criterion for the ocean surface block images and the binarization criterion for the land surface block images, and then enlarging the corrected image in such a way that the corrected image has a size equal to a size of the input image.

Supplementary Note 12

The image processing device according to any one of supplementary notes 1 to 11, in which the generation means performs morphology processing on the land mask image when generating the land mask image.

Supplementary Note 13

An image processing method implemented by an information processing device, the image processing method including:

segmenting an input image representing a result of observing an ocean surface region and a land surface region from overhead into ocean surface block images representing the ocean surface region and land surface block images representing the land surface region, based on a predetermined segmentation criterion;

determining a binarization criterion for the ocean surface block images, based on a scattering model for electromagnetic waves in the ocean surface region;

determining a binarization criterion for the land surface block images, based on the binarization criterion for the ocean surface block images and a positional relationship between the ocean surface block images and the land surface block images; and generating a land mask image for differentiating between the ocean surface region and the land surface region by performing binarization processing on the input image based on the binarization criterion for the ocean surface block images and the binarization criterion for the land surface block images.

Supplementary Note 14

A recording medium having an image processing program stored thereon, the image processing program causing a computer to implement:

a segmentation function of segmenting an input image representing a result of observing an ocean surface region and a land surface region from overhead into ocean surface block images representing the ocean surface region and land surface block images representing the land surface region, based on a predetermined segmentation criterion;

a first determination function of determining a binarization criterion for the ocean surface block images, based on a scattering model for electromagnetic waves in the ocean surface region;

a second determination function of determining a binarization criterion for the land surface block images, based on the binarization criterion for the ocean surface block images and a positional relationship between the ocean surface block images and the land surface block images; and a generation function of generating a land mask image for differentiating between the ocean surface region and the land surface region by performing binarization processing on the input image based on the binarization criterion for the ocean surface block images and the binarization criterion for the land surface block images.

REFERENCE SIGNS LIST 10 image processing device
10A image processing device
100 input image
101 image resolution information
102 ship maximum length information
11 segmentation unit
11A segmentation unit
110 segmentation criterion
111 first binarization threshold value
112 ocean surface block image
113 land surface block image
12 ocean surface region binarization criterion determination unit
120 second binarization threshold value
13 land surface region binarization criterion determination unit
130 third binarization threshold value
14 pixel-by-pixel binarization criterion determination unit
140 fourth binarization threshold value
15 generation unit
15A generation unit
150 land mask image
151 binarization unit
152 morphology processing unit
153 image enlargement unit
16 input image processing unit
160 corrected image
161 image reduction unit
162 median filter unit
17 verification unit
170 re-segmentation criterion
20 image processing device
200 input image
21 segmentation unit
210 segmentation criterion
211 ocean surface block image
212 land surface block image
22 first determination unit
220 binarization criterion
23 second determination unit
230 binarization criterion
25 generation unit
250 land mask image 900 information processing device
901 CPU
902 ROM
903 RAM
904 hard disk (storage device)
905 communication interface
906 bus
907 recording medium
908 reader/writer
909 input/output interface

What is claimed is:

1. An image processing device comprising:
at least one memory storing a computer program; and
at least one processor configured to execute the computer program to:
segment an input image representing a result of observing an ocean surface region and a land surface region from overhead into ocean surface block images representing the ocean surface region and land surface block images representing the land surface region, based on a predetermined segmentation criterion;
determine a binarization criterion for the ocean surface block images, based on a scattering model for electromagnetic waves in the ocean surface region;
determine a binarization criterion for the land surface block images, based on the binarization criterion for the ocean surface block images and a positional relationship between the ocean surface block images and the land surface block images; and
generate a land mask image for differentiating between the ocean surface region and the land surface region by performing binarization processing on the input image based on the binarization criterion for the ocean surface block images and the binarization criterion for the land surface block images.

2. The image processing device according to claim 1, wherein the processor is configured to execute the computer program to:
segment the input image into block images having a predetermined size and then sorts the block images into the ocean surface block images and the land surface block images by performing binarization processing on pixels constituting the block images, based on a first binarization threshold value indicated by the predetermined segmentation criterion.

3. The image processing device according to claim 2, wherein the processor is configured to execute the computer program to:
verify whether a number of the ocean surface block images being sorted and a size of the block images satisfy a re-segmentation criterion that has been predetermined; and
when verifying that the number of the ocean surface block images and the size of the block images satisfy the re-segmentation criterion re-segment more finely the input image into the block images and then sort the block images re-segmented more finely into the ocean surface block images and the land surface block images.

4. The image processing device according to claim 3, wherein the processor is configured to execute the computer program to
limit a target to be re-segmented more finely to the land surface block images among the block images.

5. The image processing device according to claim 3, wherein
the re-segmentation criterion indicates that the number of the ocean surface block images is smaller than a required minimum value that has been predetermined and that the size of the block images is larger than a re-segmentable minimum value that has been predetermined.

6. The image processing device according to claim 5, wherein the processor is configured to execute the computer program to:
detect a non-re-segmentable state, in which the number of the ocean surface block images is smaller than the required minimum value and the size of the block images is equal to the re-segmentable minimum value; and
generate the land mask image representing that the entire input image falls within the land surface region, when detecting the non-re-segmentable state.

7. The image processing device according to claim 1, wherein the processor is configured to execute the computer program to
calculate third binarization threshold values indicated by the binarization criterion for the land surface block images by performing weighted addition on second binarization threshold values indicated by the binarization criterion for the ocean surface block images, based on distances between the ocean surface block images and the land surface block images.

8. The image processing device according to claim 2, wherein the processor is configured to execute the computer program to:
determine a binarization criterion for each pixel included in the input image, the binarization criterion representing applying the binarization criterion for the ocean surface block images to a pixel belonging to the ocean surface block images and applying the binarization criterion for the land surface block images to a pixel belonging to the land surface block images; and
generate the land mask image by performing binarization processing on the input image based on the binarization criterion for each pixel.

9. The image processing device according to claim 8, wherein the processor is configured to execute the computer program to
use a low-pass filter to calculate a fourth binarization threshold value representing the binarization criterion for each pixel, with respect to a particular pixel located in a vicinity of a boundary between the block images, among the pixels constituting the input image.

10. The image processing device according to claim 1, wherein the processor is configured to execute the computer program to:
segment the input image into the ocean surface block images and the land surface block images, using a first false alarm rate representing a probability of an error happening in differentiating between the land surface region and the ocean surface region; and
use a second false alarm rate to determine the binarization criterion for the ocean surface block images.

11. The image processing device according to claim 1, wherein the processor is configured to execute the computer program to:
reduce the input image based on a maximum value of a size of a ship that is likely to be present in the ocean surface region in such a way that an image corresponding to a region representing the ship has one pixel in the input image, and inputting, to the processor, a corrected image in which the ship has been removed from the input image by applying a median filter to the input image being reduced;
sort the corrected image into the ocean surface block images and the land surface block images; and
generate the land mask image by performing binarization processing on the corrected image, based on the binarization criterion for the ocean surface block images and the binarization criterion for the land surface block images, and then enlarging the corrected image in such a way that the corrected image has a size equal to a size of the input image.

12. The image processing device according to claim 1, wherein the processor is configured to execute the computer program to
perform morphology processing on the land mask image when generating the land mask image.

13. An image processing method implemented by an information processing device,
the image processing method comprising:
segmenting an input image representing a result of observing an ocean surface region and a land surface region from overhead into ocean surface block images representing the ocean surface region and land surface block images representing the land surface region, based on a predetermined segmentation criterion;
determining a binarization criterion for the ocean surface block images, based on a scattering model for electromagnetic waves in the ocean surface region;
determining a binarization criterion for the land surface block images, based on the binarization criterion for the ocean surface block images and a positional relationship between the ocean surface block images and the land surface block images; and
generating a land mask image for differentiating between the ocean surface region and the land surface region by performing binarization processing on the input image based on the binarization criterion for the ocean surface block images and the binarization criterion for the land surface block images.

14. A non-transitory computer-readable recording medium having an image processing program stored thereon, the image processing program causing a computer to implement:
a segmentation function of segmenting an input image representing a result of observing an ocean surface region and a land surface region from overhead into ocean surface block images representing the ocean surface region and land surface block images representing the land surface region, based on a predetermined segmentation criterion;
a first determination function of determining a binarization criterion for the ocean surface block images, based on a scattering model for electromagnetic waves in the ocean surface region;
a second determination function of determining a binarization criterion for the land surface block images, based on the binarization criterion for the ocean surface block images and a positional relationship between the ocean surface block images and the land surface block images; and
a generation function of generating a land mask image for differentiating between the ocean surface region and the land surface region by performing binarization processing on the input image based on the binarization criterion for the ocean surface block images and the binarization criterion for the land surface block images.

* * * * *